Patented Aug. 20, 1946

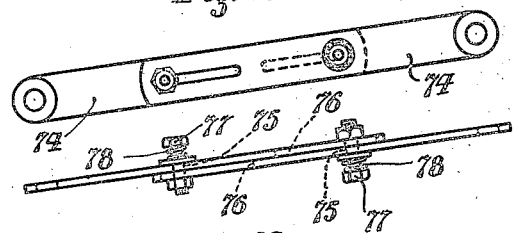
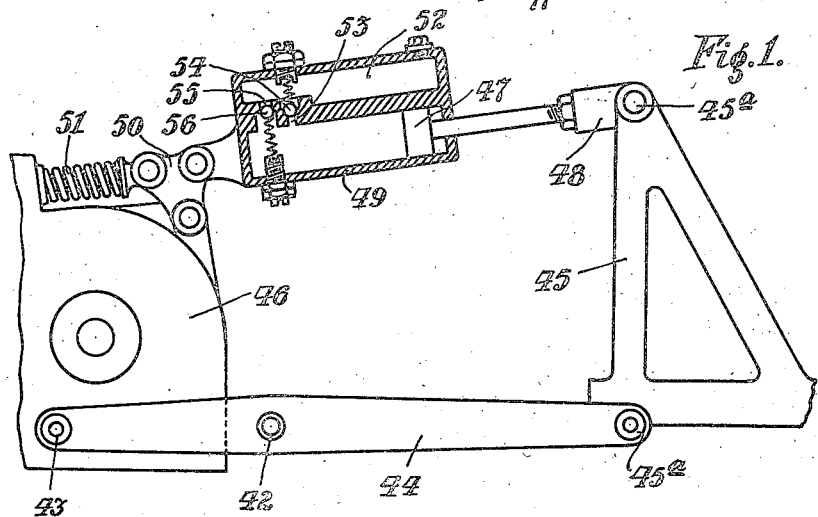
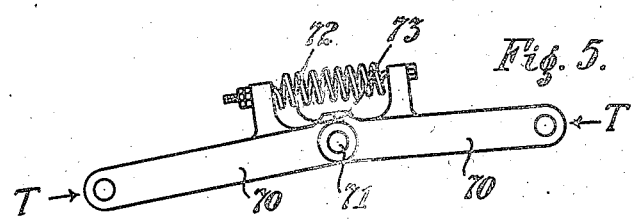

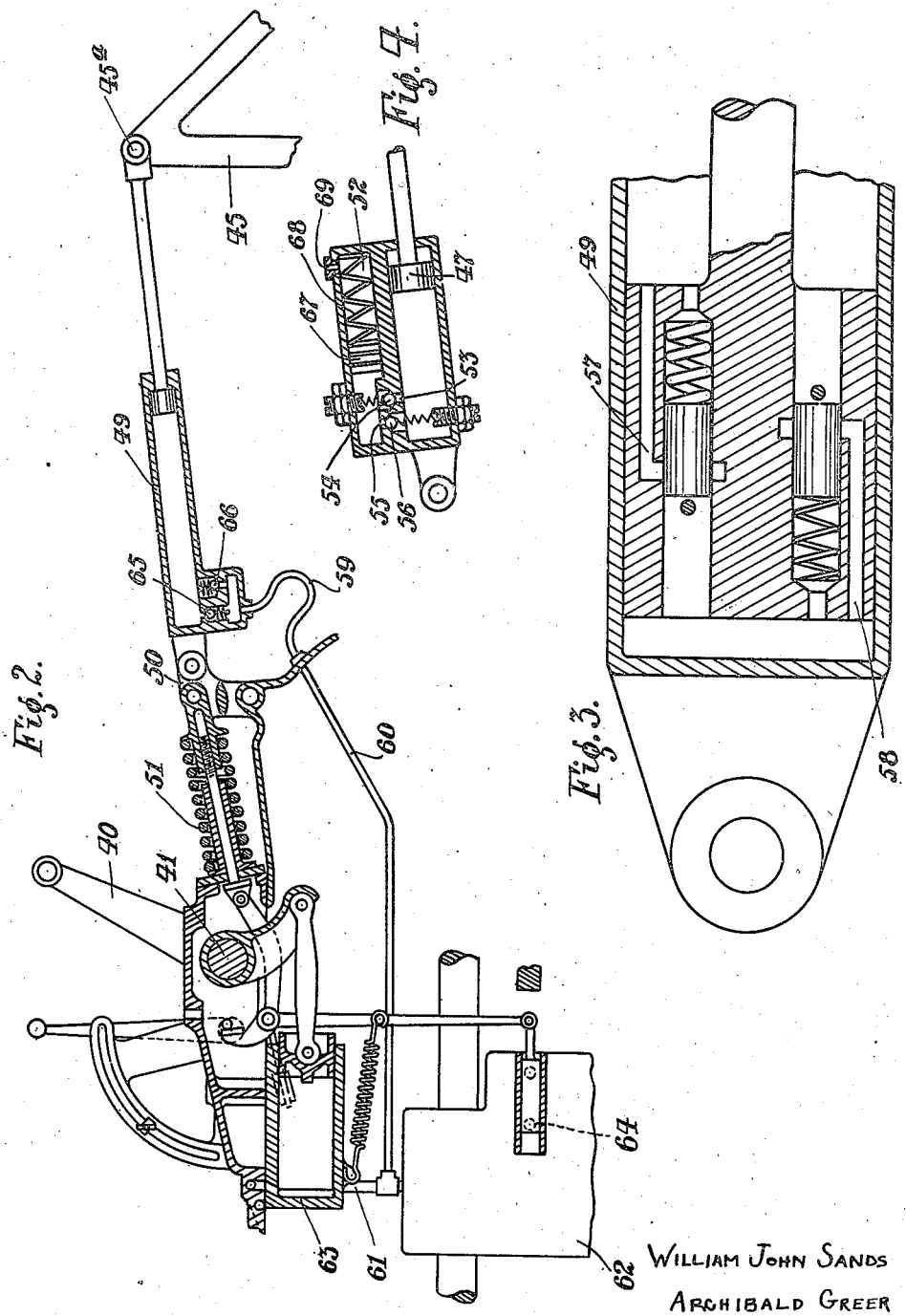

2,405,980

UNITED STATES PATENT OFFICE 2,405,980

HITCH MEANS FOR CONNECTING TRAILED DEVICES TO TRACTIVE VEHICLES

William John Sands and Archibald Greer, Belfast, Northern Ireland

Application September 6, 1943, Serial No. 501,378
In Great Britain February 27, 1942

18 Claims. (Cl. 280—33.44)

This invention relates to hitch means for connecting trailable devices to tractive vehicles and especially to hitch means which comprises spaced, for example, upper and lower connection means, for example, link means connected at spaced or upper and lower points to the vehicle and trailable device and which, in resisting angular movement of the trailable device, have compressive and tensile stresses set up therein. The invention relates especially to agricultural tractors embodying the Ferguson system of linkage for connecting trailable devices to the tractor, typical examples of this system being shown in United States Patents Nos. 2,118,180, 2,118,181, and 2,356,231. The term trailable device is intended to cover all soil- or ground-engaging or plant-engaging implements, for example, agricultural implements, which by their resistance to movement set up compressive and tensile stresses in the links.

An object of the invention is to provide cushion link means adapted to yield against a resistant when the stress in the hitch means exceeds a predetermined amount as, for example, when the implement strikes an obstruction, in order to prevent damage to the implement, hitch means or tractive vehicle.

A further object is to provide a cushion link consisting of a plunger and cylinder device adapted to receive a fluid resistant, for example, oil which is expelled through a flow-resisting passage controlled by a loaded release valve. The oil may be expelled into a relief chamber or the passage may be connected to the pressure side of the hydraulic power unit of a Ford tractor with the Ferguson hydraulic control system.

A further object of the invention is to provide a cushion link comprising relatively slidable parts adapted to slide against a frictional resistant when the stress in the links exceeds a predetermined amount.

A further object is to provide a cushion link comprising hinged parts having the hinge offset from the force acting along the link so as to "break" when the force in the link exceeds a predetermined amount.

In order that the invention may be clearly understood the following practical embodiments will be described, but merely by way of example, with reference to the accompanying drawings in which:

Fig. 1 is a side view of a cushion hitch link as applied to a Ferguson three link hitch as set forth in prior Patents Nos. 2,118,180 or 2,118,181 or 2,356,231.

Fig. 2 is a similar view of a cushion link as applied to a tractor having a power unit and hitch as set forth in said Patent No. 2,356,231. The latch mechanism as set forth in said Patent No. 2,356,231 is not shown but it may be used if desired.

Fig. 3 is a modification of the cushion piston and cylinder.

Fig. 4 is a detail view showing a modification of the arrangement in Fig. 1.

Figs. 5 and 6 show two further alternative forms of cushion link.

Figure 7:
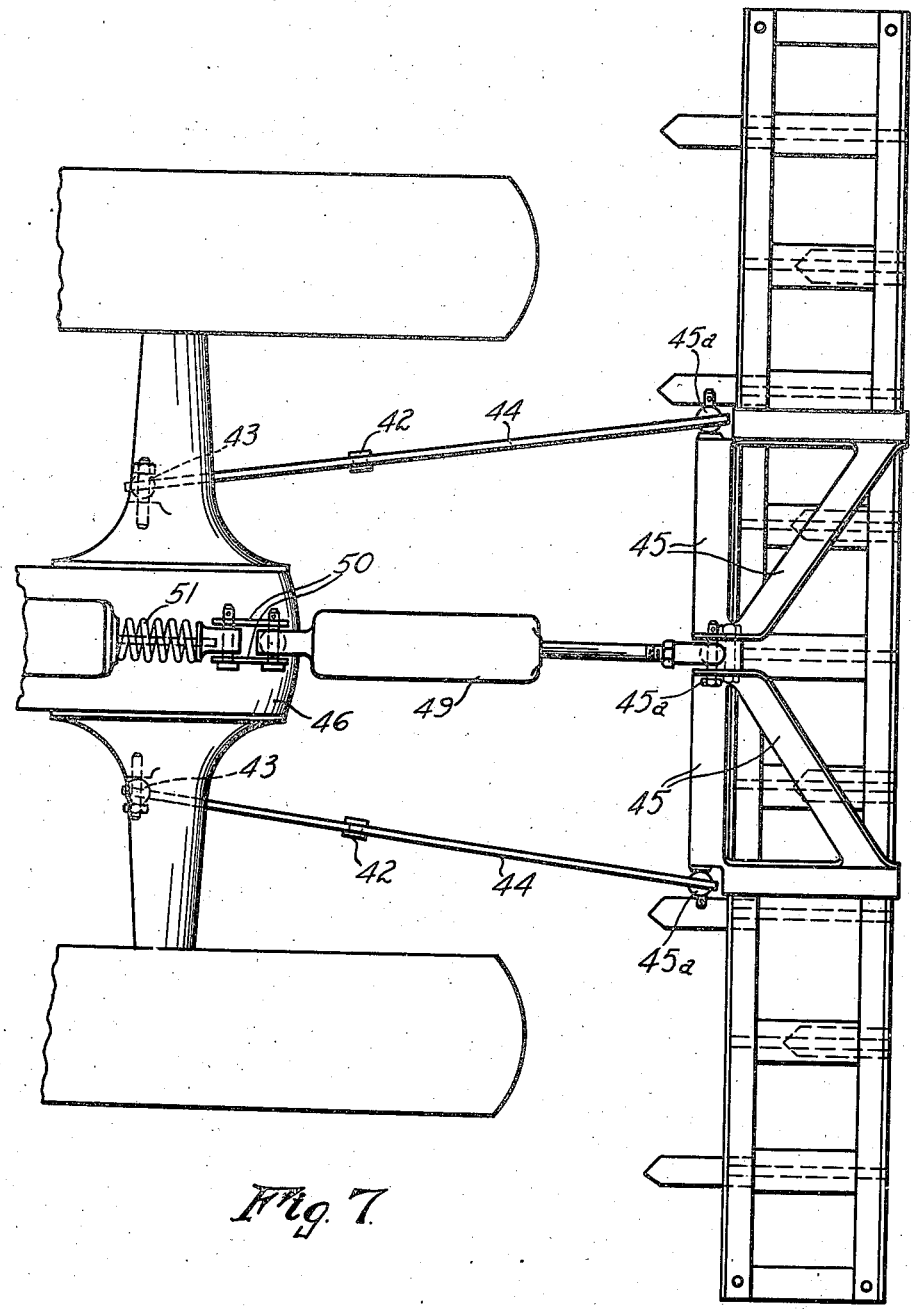
Fig. 7 is a plan view of the cushion link and associated parts shown in Fig. 2, the rear end portion of the tractor and the implement also being indicated.

Fig. 1 shows a safety or cushion link arrangement for use with soil-engaging implements, for example agricultural implements. 45 denotes the implement frame which is universally attached in known manner at 45a to the upper and lower links of the Ferguson three link attachment which normally consists of an upper link universally connected to the implement at the upper attachment point 45a and two laterally spaced links 44 universally connected to the implement at the lower attachment points 45a. The upper link is normally attached to the bell crank 50 on the tractor so as to be capable of upward and lateral pivotal movement and the lower links are universally attached to the tractor at laterally spaced points 43, the spacing of the attachment points on the tractor in relation to those on the implement being such that the top link converges forwardly with respect to the lower links and the latter converge forwardly with respect to each other. A typical example of this known attachment is shown in United States Patent No. 2,223,002. The numeral 46 denotes the well-known Ford tractor which has a Ferguson hydraulic control apparatus for the linkage and implement operating on the principles as set forth for example in the United States Patent No. 2,118,181 or 2,356,231, and which includes lifting cranks and drop links (not shown), the latter being pivotally connected to the lower links at the points 42. Instead of the usual upper link there is provided an upper link consisting of a piston 47 having an adjustable screwthreaded connection with the sleeve 48, which is universally connected in the usual way to the implement. This connection allows alteration in length. The piston 47 engages in the cylinder 49 which constitutes the other part of the link and is pivotally connected in the usual way to the bell crank 50 and balance spring 51 of the automatic hydraulic depth control apparatus. The cylinder has a relief chamber 52 connected to it by a release port 53 normally closed by an adjustably spring-urged ball valve 54. There is also a return port 55 controlled by a similarly controlled ball valve 56.

In operation the valve 54 is preferably so loaded that it will only release the oil or the like in the cylinder when the balance spring 51 has been compressed beyond normal, as when an obstruction is struck, to operate the overload release arrangements as set forth in United States Patent No. 2,118,181 or Patent No. 2,356,231 and cause wheel spin. Thereafter the increase of compression due to the momentum of the tractor and implement "blows" the valve 54 and the implement rocks counterclockwise as viewed in Fig. 1 about its lower connections 45a and thus excessive stresses and consequent breakage in the implement, linkage and other associated parts is obviated or mitigated. The momentum is absorbed in forcing the oil or the like through the port 53 and in compressing the air in the relief chamber 52. Subsequently, in order to clear the obstruction, the operator may reverse the tractor, at the same time raising the implement by operating the hydraulic power lift which raises the links and the implement. This reversing and/or raising, due to the tendency of the implement to rotate clockwise about the lower attachment points 45a, causes tension in the top link and restores it to its full length, the oil being drawn back into the cylinder through the port 55 past the ball valve 56 which is only lightly spring-controlled. The return of the oil is also assisted by the compressed air in the relief chamber 52. It follows from the above that due to the incompressibility of the oil and the loaded release valve the top link will remain rigid or of constant length throughout the normal range of soil pressures on the implement and thus maintain the latter at the proper angle and will also act in the same manner as the ordinary top link to compress more or less the balance spring 51 and operate the usual automatic depth control, the action of which is described in said Patent 2,118,181 or 2,356,231.

Instead of providing a separate recuperation or relief chamber it may be arranged, as shown in Fig. 3, that the oil is transferred from one side of the piston to the other through a suitable valve-controlled release passage 57 and return passage 58 located in the piston itself. Fig. 3 shows the piston in the collapsed position.

It will be understood that the release valve may be adjusted to release at any desired predetermined pressure as may be found most beneficial in relation to the pressure in, or compression of, the balance spring 51 which is necessary to operate the overload release as set forth in said prior Patents 2,118,181 and 2,356,231. The release port or passage is suitably shaped and dimensioned.

Alternatively, as shown in Fig. 2, the cylinder 49 may be connected by the flexible conduit 59 and pipe 60 to the pressure side of the hydraulic lifting and lowering power unit as disclosed, for example, in the said Patent No. 2,356,231, for example to the pipe 61 between the pump 62 and the hydraulic ram 63 of the Ford tractor with Ferguson system. The operation of the power unit is described in said prior Patent 2,356,231 and need not be further described in detail. 41 denotes the usual cross shaft which has a crank arm 40 at each end, each crank arm being pivotally connected to the usual drop link which is pivotally connected to the corresponding lower hitch link as at 42 in Fig. 1. On excess of draft pressure the link will collapse and the oil will escape from the cylinder 49 together with that from the power unit ram 63 through the release port 64 of the hydraulic unit on the tractor. A spring-loaded, one way release valve 65 and recuperation valve 66, as above described are provided between the top link cylinder 49 and the port 64. On raising the implement the pressure in the power unit ram 63 and the link cylinder 49 will be restored and will assist the tension then existing in the link to extend the link to its normal length.

Fig. 4 shows a modification of the arrangement in Fig. 1. A piston 67 normally urged by a compression spring 68 to the position shown is provided in the relief chamber 52 which is provided with a screwed plug having an air vent 69. When oil is expelled into the relief chamber 52 the piston 67 is forced back against the spring 68. With this arrangement the oil is kept at all times above atmospheric pressure, that is even during the return of the oil into the cylinder 49. Thus air is prevented from getting into the oil as, for example, from the outer side of the piston 47. The exclusion of air is important, it being essential to have the cylinder in all cases filled with incompressible or substantially incompressible liquid so as to insure that the link will remain rigid, that is, of constant length under normal draft pressures, and will thus hold the implement rigidly in the correct angular position with respect to the forward movement through the soil.

In an alternative form of safety or cushion link as shown in Fig. 5, the link consists of two parts 70 pivotally connected at 71 and having abutting faces or stop means 72 forming a "knife" hinge. The parts are maintained in this position, that is, with the centre 71 offset from the line of the compressive force T—T, by the adjustable tension spring 73. This hinged link is arranged to "break" upwards at a predetermined pressure and so relieve the shock on the implement and associated parts. The pressure at which the link yields may be adjusted by altering the tension of the spring and/or the offset of the pivot 71 from the line T—T. The link resets itself to the position shown when the implement is backed and/or raised. The spring or two similar springs may be set so as to straddle the link when it bends but it is desirable that the line of action of the spring should not cross too far to the lower side of the pivot 71 to prevent automatic resetting of the link by the backing and/or raising of the implement.

Fig. 6 shows a further alternative form of safety top link which consists of two parts 74 each having a hole 75 and slot 76 and being frictionally urged together by bolts 77 and springs 78. The resistant in this case is the frictional engagement of the parts 74 and should an obstruction be struck these parts slide along each other. The contacting faces of the parts may be provided with friction facings adapted to give a substantially constant frictional engagement under varying weather conditions. The link in said case has to be reset manually by the operator.

What we claim is:

1. Hitch means for connecting a trailable device to a tractive vehicle comprising spaced connecting means respectively subjected to compressive and tensile stress due to the draft on the device, one of the connecting means comprising relatively movable parts in the form of a piston and cylinder device adapted to receive a resistant fluid, a restricted flow-resisting passage from the cylinder, a loaded release valve controlling said passage and adapted to release the fluid when the stress in the connecting means exceeds a predetermined amount, as when the trailable device strikes an obstruction, to allow a cushioning movement of the piston and cylinder which prevents undue stress in and damage to the trailable device, hitch and vehicle and absorbs the momentum of the vehicle in expelling the oil, and means for restoring the piston and cylinder to normal working position.

2. Hitch means for connecting an implement to a tractor vehicle comprising upper and lower link means subjected to compressive and tensile stresses in resisting turning movement of the implement due to the draft thereon, one of said link means comprising a relatively movable plunger or piston and cylinder adapted to contain a substantially incompressible fluid, a restricted flow-resisting passage from the cylinder, a loaded release valve controlling said passage and adapted to release the fluid and allow a cushioning movement of the piston and plunger from normal working position when the stress in the link means exceeds a predetermined amount and means for relatively restoring the piston and cylinder to normal working position.

3. Hitch means as claimed in claim 2 in which said means for restoring the piston and cylinder comprises raising means on the tractor for raising the link means and implement whereupon the weight of the latter reverses the stresses in the link means.

4. Hitch means as claimed in claim 2, in which said restoring means comprises a pressure fluid power unit on the tractor and a fluid conduit between said power unit and the cylinder space whereby the piston and cylinder can be restored to working position by fluid pressure from the power unit.

5. In combination a tractor, a soil-engaging implement and hitch means pivotally connected to the implement and to the tractor to allow relative up and down movement between the tractor and implement, the tractor comprising a power unit for raising and lowering the hitch means and implement and supporting the weight thereof from the tractor and control means for putting the power unit out of effective operation so that the weight of the implement is no longer carried by the tractor, the hitch means comprising upper and lower link means subjected to compressive and tensile stress in resisting the turning effect of the draft on the implement, a resilient draft-balancing member in one of the link means and a connection between said link means and the control means whereby the power unit is put out of effective operation when an excess draft occurs on the implement and the balance member is stressed and strained beyond a predetermined limit, and one of the link means comprising relatively movable parts, and a resistant between said parts adapted to yield, but not before the balance member has been stressed beyond said limit, to allow relative movement between said parts and a yielding movement between the implement and tractor.

6. The combination as claimed in claim 5, in which said relatively movable parts are in the form of a piston and cylinder adapted to receive a substantially incompressible fluid and having a restricted flow-resisting release passage from said cylinder and a loaded automatic release valve controlling said passage.

7. In combination a tractor having a pressure fluid power unit, two laterally spaced attachment points for pivotal attachment of two hitch links, a third attachment point vertically spaced from said laterally spaced attachment points for the pivotal attachment of a third hitch link, an implement having two laterally spaced attachment points and a third attachment point vertically spaced from said two points and having a soil-engaging part located below the attachment points, and a hitch connection comprising two laterally spaced links and a third link vertically spaced therefrom pivotally attached to said points on the tractor and implement and a connection between said two links and the power unit for raising and lowering the implement with reference to the tractor, said third link comprising a relatively movable piston and cylinder adapted to receive a substantially incompressible fluid resistant such as oil, a restricted flow-resisting release passage for the fluid from the cylinder and a spring loaded automatic release valve controlling said passage adapted to release the oil when the stress in the link exceeds a predetermined amount and allow a cushioning movement of the piston and cylinder.

8. The combination as claimed in claim 7, comprising an oil relief chamber with which said passage communicates, a further passage between the cylinder space and said chamber and a slightly spring-loaded one-way valve in said further passage to permit return of the oil and resetting of the piston and cylinder to normal working position.

9. The combination as claimed in claim 7, comprising an oil relief chamber with which said passage communicates, a further passage between the cylinder space and said chamber, a lightly spring-loaded one-way valve in said further passage to permit return of the oil, a piston in said relief chamber and resilient means urging same to oppose the expulsion of oil from the cylinder so as to maintain the oil pressure at all times above atmospheric pressure.

10. The combination as claimed in claim 7, comprising an oil relief chamber with which said passage communicates, a further passage between the cylinder space and said chamber and a lightly spring-loaded one-way valve in said further passage to permit return of the oil and resetting of the piston and cylinder to normal working position and means for adjusting the spring load on said valves.

11. For the combination which comprises a tractor and a soil-engaging implement, the tractor comprising an upper link and two lower laterally spaced links for attaching the implement so as to be capable of up and down movement on the tractor, a power unit comprising a pump and a device operable by pressure fluid from the pump for moving the implement up and down and supporting it on the tractor, a control valve for said device movable into fluid-admitting, holding or release positions respectively to raise, hold or lower the implement on the tractor, an implement draft-transmitting connection between the implement draft-transmitting connection between the implement and valve including said top link and balance means resistant to the draft on the implement and adapted on variations of the draft of the implement to cause movement of the valve to raise or lower the implement to correct said variations and maintain the implement at a constant depth of cut and adapted to move the valve to fluid-release position when there is an excess of draft pressure on the implement to relieve the tractor of the implement weight and cause the tractor driving wheels to slip; a top link which comprises a relatively movable piston and cylinder adapted to receive oil, a conduit between said cylinder and the pressure side of said valve, a one-way spring-loaded release valve in said conduit adapted to release the oil from the cylinder when there is said excess of draft pressure on the implement, a restricted flow-resisting port in said passage, a further return passage between said cylinder and the pressure side of said control valve, and a spring loaded one-way valve in said further passage to allow return of oil to the cylinder when the control valve is moved to fluid-admitting position.

12. In combination a tractor having spaced attachment means, a soil-working implement having spaced attachment means, a spaced hitch link means pivotally connected to both said attachment means and allowing the implement to swing relatively to the tractor but resisting angular movement of the implement under the effect of the soil pressure, one of said link means comprising a relatively movable piston and cylinder respectively connected to the attachment means on the tractor and implement and adapted to receive an incompressible fluid resistant, a restricted flow-resisting passage for the fluid in the cylinder and a loaded release valve normally closing said passage to maintain rigidity of the link means and restrain angular movement of the implement but adapted automatically to be opened to release the fluid and destroy the rigidity of the link means and allow angular movenet of the implement when the stress in the link means and consequently the fluid pressure in the cylinder exceed a predetermined value.

13. For the combination which comprises a tractor and a soil-engaging implement, the tractor having pivotal attachments for an upper link and two lower laterally spaced links for attaching the implement so as to be capable of up and down movement, a power unit for moving the implement up and down and supporting it on the tractor and a draft-transmitting connection between the implement and power unit and including said top link and yieldable balance means resistant to the draft on the implement and adapted to control the power unit to support the implement at a predetermined depth in accordance with the draft pressure; a cushion top link which comprises relatively movable parts and a resistant therebetween adapted to yield only when the said balance means has been stressed beyond a predetermined limit.

14. For a tractor having upper and lower connection points for upper and lower hitch links, and one of said points being movable relatively to the tractor under the influence of the implement draft acting against yieldable draft-balancing means, a power unit controlled in accordance with the position of said movable point to support the implement on the tractor and control the depth of penetration of the implement; a cushion top hitch link comprising a relatively movable piston and cylinder adapted to receive oil, a restricted flow-resisting passage connecting said cylinder and the pressure side of said hydraulic unit, a spring loaded one-way release valve in said passage to release oil when the oil in the cylinder exceeds a predetermined pressure and the draft-balancing means has been stressed beyond a predetermined limit as by the implement striking an obstruction, a further passage between said cylinder and the pressure side of said hydraulic unit and a lightly loaded one-way valve to permit return of the oil from the said unit to the cylinder to restore the latter and piston to normal working position.

15. In combination a tractor, a soil-engaging implement and hitch means pivotally connected to the implement and to the tractor to allow relative up and down movement between the tractor and implement, the tractor comprising a power unit for raising and lowering the hitch means and implement and supporting the weight thereof from the tractor and control means for said power unit, the hitch means comprising upper and lower link means subjected to compressive and tensile stress in resisting the turning effect of the draft on the implement, a resilient draft-balancing member connected to one of the link means and forming part of said control means to cause the power unit automatically to adjust the depth of penetration of the implement in accordance with the draft pressure and the yield of the balancing member, and one of the link means comprising relatively movable parts and a resistant between said parts adapted to yield, but not before the balance member has been stressed beyond a predetermined limit as when the implement encounters an obstruction, to allow relative movement between said parts and a yielding movement between the implement and tractor.

16. In combination a tractor including upper and lower pivotal connection means, an implement having pivotal connection means, a draft linkage between said lower pivotal connection means on the tractor and said pivotal connection means on the implement, a further compression-resisting connection between the upper pivotal connection means and the tractor and the implement and which is spaced from said draft linkage normally to resist angular movement of the implement about the connection to the draft linkage, said compression-resisting connection comage, said compression-resisting connection comprising relatively movable parts and a resistant between said parts adapted to yield when the draft pressure on the implement exceeds a predetermined amount to allow said angular movement of the implement.

17. In combination a tractor including upper and lower pivotal connection means, an implement having pivotal connection means, a draft linkage between said lower pivotal connection means on the tractor and said pivotal connection means on the implement, a further compression-resisting connection between the upper pivotal connection means on the tractor and the implement and which is spaced from said draft linkage normally to resist angular movement of the implement about its connection to the draft linkage, said compression-resisting connection comage, said compression-resisting connection comprising relatively movable parts in the form of a piston and cylinder device adapted to receive a substantially incompressible fluid, a restricted flow-resisting passage from the cylinder, a loaded release valve controlling said passage and adapted to release fluid and allow said angular movement of the implement when the draft pressure on the implement exceeds a predetermined amount.

18. For the combination which comprises a tractor and a soil-engaging implement, the tractor having pivotal attachments for an upper link and two lower laterally spaced links for attaching the implement so as to be capable of up and down movement, a power unit for moving the implement up and down and for supporting it on the tractor and a draft-transmitting connection between the implement and power unit and including said top link and yieldable balance means resistant to the draft on the implement and adapted to control the power unit to support the implement at a predetermined depth in accordance with the draft pressure; a cushion top link which comprises a relatively movable piston and cylinder adapted to receive an incompressible fluid resistant, a bleed passage for the fluid in the cylinder, and a spring-loaded release valve normally closing said passage and movable to open position only when the balance means has been stressed beyond a predetermined limit.

WILLIAM JOHN SANDS.
ARCHIBALD GREER.